UNITED STATES PATENT OFFICE.

JOHN MACKINTOSH, OF HALIFAX, ENGLAND.

PAPER OR THE LIKE FOR WRAPPING OR PARCELING SWEETMEATS OR OTHER SUITABLE FOODSTUFFS.

1,113,904.  Specification of Letters Patent.  Patented Oct. 13, 1914.

No Drawing.  Application filed May 29, 1913.  Serial No. 770,592.

*To all whom it may concern:*

Be it known that I, JOHN MACKINTOSH, a subject of the King of Great Britain, residing at Halifax, in the county of York, England, have invented new and useful Improvements in and Relating to Paper or the Like for Wrapping or Parceling Sweetmeats or other Suitable Foodstuffs, of which the following is a specification.

This invention relates to paper or the like used in wrapping or parceling foodstuffs more especially toffee, caramels, and other sweetmeats, and the object of my invention is to impart to such paper or the like a scent or perfume of a desirable pungency and corresponding with the kind of scent or flavor of the article inclosed. By imparting a corresponding scent to the wrapping material I prevent the customary objectionable flavor of such material from being transmitted to or absorbed by the sweet or the like.

With the use of my improved wrapping material I also improve the flavor of the article, whet the appetite of the consumer with the increased odor arising from the receptacle or package, and enable a cheaper quality of wrapper or paper to be used.

According to my invention, especially with reference to waxed or the like papers, I preferably add to and mix with the wax or the like used in the manufacture of such papers, while in a melted or liquid state, a suitable proportion of flavoring matter or liquid, the quantity varying from a few grains to an ounce or more according to the strength of the flavoring employed or the pungency of odor desired, or to the quantity of wax or its equivalent being dealt with. If the wrapping material is for wrapping vanilla toffee a vanilla flavoring or scent is used, if for a lemon flavored article a lemon flavor or scent is added, and so on.

The toffee or other sweet after being wrapped will either absorb some of the additional or extra flavor in the wrapper, or be prevented from losing any portion of its flavor by absorption by the wrapper. In this manner also the taste of the wax, which is now such an objectionable feature in the use of waxed papers, is obliterated, while the article itself does not suffer in quality by the absorption of a portion of its flavor by the wrapper or by the absorption of the odor of the wrapper, as is now the case where ordinary paper is used.

The flavored wax or the like is applied to the wrapping paper or the like in the ordinary way, or, the flavoring may be sprinkled upon the hard waxed paper and allowed to dry thereon. Or said flavoring may be added to such paper or wrapper in any other suitable manner or by any suitable means.

What I claim as my invention and desire to secure by Letters Patent is:—

Waxed paper for wrapping toffee to which is applied an additional or extra flavor corresponding with the flavor of the article to be wrapped as will disguise the paraffin or wax flavor and prevent absorption of flavor from the article by the wrapper, as set forth.

In testimony whereof I have signed my name to this specification in the presence of two subscribing witnesses.

JOHN MACKINTOSH.

Witnesses:
ABNER REED,
HARRY TOOTHILL.